May 9, 1967  R. G. ROHRBERG  3,319,043
METHOD AND MEANS FOR WORKPIECE JOINDER
Filed June 10, 1963
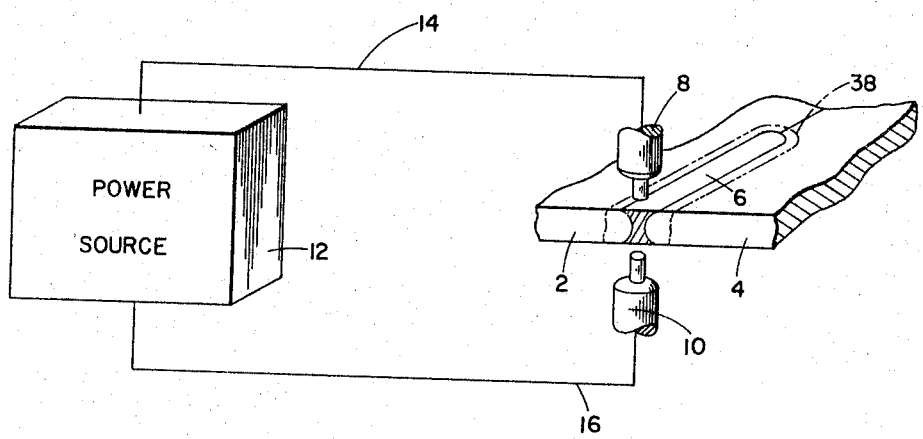
FIG. 1
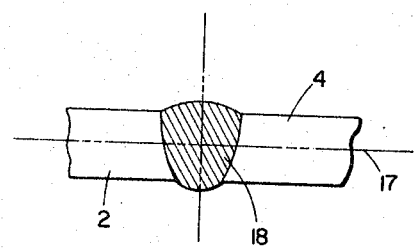
FIG. 2
PRIOR ART
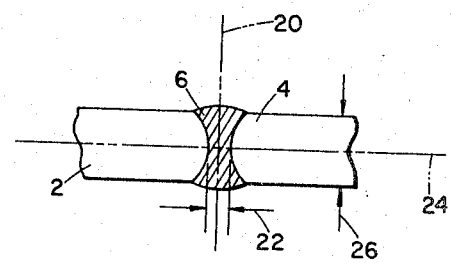
FIG. 3
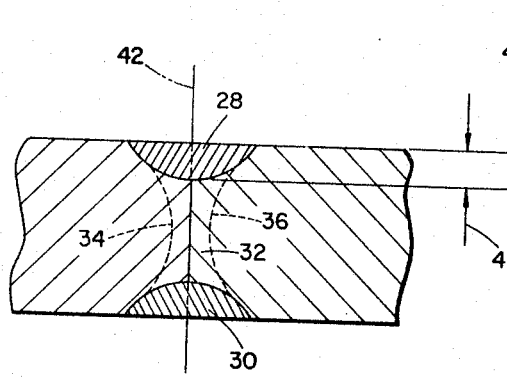
FIG. 4
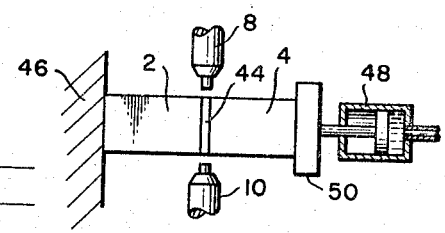
FIG. 5
*INVENTOR.*
RODERICK G. ROHRBERG
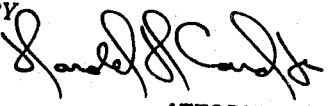
ATTORNEY

United States Patent Office 3,319,043
Patented May 9, 1967

3,319,043
METHOD AND MEANS FOR WORKPIECE JOINDER
Roderick G. Rohrberg, Inglewood, Calif., assignor to North American Aviation, Inc.
Filed June 10, 1963, Ser. No. 286,785
17 Claims. (Cl. 219—137)

This invention concerns improved method and means for joining together two or more metallic elements, especially thin-walled elements having a particular sensitivity to the application of welding heat. More particularly, this invention concerns welding by electrodes connected to a source of electrical power using a technique which also is adapted to produce diffusion bonded joints. Also, this invention contemplates improved welding techniques in fabricating workpieces of lightweight sheet or panel form, or joinder of members having relatively thin portions such as sheet metal flanges or the like which are welded or diffusion bonded to other workpiece portions of similar nature.

Although the invention is of wide applicability in fabricating any type of structure involving joiner of thin-walled components, it will be described for the sake of illustration in connection with welding of steel sheets.

Welding of thin gage sheet metal presents formidable problems not encountered in welding workpieces having substantial mass. As in welding generally, the puddle temperature is normally raised much higher than the melting point of the base metal, and some welding heat permeates the base metal surrounding the weld area. Changes such as expansion and shrinkage of the heat-affected area normally result from the welding operation, as well as changes in physical properties such as strength and ductility. These several effects are particularly emphasized in the case of thin-walled members joined to each other by welding, due primarily to the high rate of thermal conductivity of thin metallic sections, causing welding heat to be generally spread over a wide area which produces greater and more uneven expansion during heating and commensurately irregular shrinkage after welding. Also, such members undergo wider variations in unit stress than do larger, heavier members during heating. Illustratively, in joining thin sheets of advanced alloy steel to each other, elongated ruptures and material failures in the weld area frequently occur during the cooling period after welding. This is primarily because shrinkage of metal in the zone of fusion and the area adjacent thereto causes high residual stress in consequence of the restraining force exerted by the base metal outside the heat-affected area. The heat-affected zone is that area containing the base metal which undergoes significant metallurgical change due to heating effects of welding. The strength of the base metal is seriously impaired by welding heat in the stated area which normally comprises a relatively narrow strip on either side of the weld seam and proximate thereto.

Moreover, in thin metallic workpieces lacking substantial mass, inability of the workpiece material to dissipate welding heat results in acute residual stress in such workpieces. Residual stress is caused by shrinkage during cooling of molten metal in the heat-affected zone, and by phase transformation of the granular structure in the base metal beyond the area of the weld. The residual stress resulting from each individual weld seam results in the application of forces in many different amounts and in non-uniform directions whereby some of the stress resulting from each weld may be cancelled or counterbalanced by stresses resulting from other welds or may combine therewith to produce cumulative stresses depending upon the direction involved in each case. The amount and direction of residual stresses resulting from each weld seam depend partly upon the amount of welding heat applied to the workpiece material, the rate of cooling in such material after welding, the distribution of mass in the workpiece component, and the properties of the workpiece material. Residual stresses cause distortion or actual separation of workpiece material along lines generally parallel and proximate the weld seam.

Based upon actual welding tests, it can be demonstrated that the adverse effects described above are aggravated by welding techniques which involve resistance heating of the workpiece or high welding currents which heat the workpiece over a generally wider area than that necessary to fuse workpiece materials along a narrow seam.

Accordingly, it is a general object of this invention to provide improved method and means for joining together workpiece components characterized by thin-walled construction.

It is a further object of this invention to provide an improved method and means for electrically welding workpiece components involving substantially less welding current than that required by conventional electrical welding techniques.

It is also an object in this case to provide improved method and means for joining workpiece materials having particular sensitivity to the application of heat, whereby this invention results in substantial reduction of post-welding shrinkage and distortion in such materials.

It is an additional object in this case to provide improved method and means for electrical welding resulting in a substantially symmetrical cross-sectional pattern about a pair of mutually normal axes in the weld nugget.

Other objects and advantages will become apparent upon close reading of the following detailed description of an illustrative embodiment of the inventive concept, reference being had to the accompanying drawing wherein:

FIGURE 1 shows a general schematic view of welding apparatus incorporating the inventive principles taught herein;

FIGURE 2 shows a cross-sectional view of a weld nugget typical of those produced by conventional welding methods known to the prior art;

FIGURE 3 shows a view generally corresponding with that shown in FIGURE 2, but resulting from the welding techniques taught in this case;

FIGURE 4 shows a view similar to FIGURE 3 but diagrammatic form for purposes of analysis, and FIGURE 5 shows a view generally similar to FIGURE 4 but involving a variation of joining technique.

Referring to the drawing, and particularly to FIGURE 1, it may be seen that the novel principles taught herein may illustratively be applied to the fusion welding of two metallic workpieces which may comprise thin sheets 2 and 4 joined along their confronting edges by an elongate weld seam 6. Seam 6 may be produced by the application of welding heat from suitable sources such as electrodes 8 and 10 situated on either side of the workpiece components 2 and 4 in substantial alignment. Electrodes 8 and 10 may comprise any of the various well known types of welding electrodes, either consumable or non-consumable, the details of which form no part of the basic inventive principles disclosed herein and are therefore not disclosed.

With further regard to FIGURE 1, it may be seen that the inventive concept in this case involves a particular relationship between the power source for the welding current, the workpiece being welded, and the electrodes which apply the current as necessary for welding. Thus, reference 12 in FIGURE 1 denotes a source of welding current which may comprise any of the several well known commercially available welding power units, the details of which are not important to the invention disclosed herein. However, it is of major significance in connection with this invention that power source 12 is operatively related to the electrodes 8 and 10 whereby welding current is supplied to one electrode and transmitted to the other electrode through the workpiece material. Thus, connection means 14 shown in FIGURE 1 transmits welding power from source 12 to electrode 8 and thence through workpiece components 2 and 4 to electrode 10, while connecting means 16 provide for return of the current flow to source 12. Source 12 may comprise either alternating current or a direct current power supply, although alternating current is preferred for reasons which will appear hereinbelow. In the former case, current flow will obviously vary in each direction alternately through connecting means 14 and 16. Also, source 12 should be adapted to provide a high frequency power characteristic superimposed upon the welding power curve, for reasons noted more particularly hereinbelow, whether D.C. or A.C. welding power is used.

From the above description, it may be seen that neither of the workpiece components 2 and 4 form a ground for the welding current and that the workpiece material forms only a tiny portion of the welding circuit. Thus, current passing from one electrode to the other electrode is fired through the workpiece material and preferably is conducted by the same. However, the technique taught herein is adaptable for use with non-conductive materials provided that the resistance to current flow between electrodes 8 and 10 offered by the workpiece material is not so great as to prevent an arc from being struck across the electrode gap. Nonetheless, certain highly beneficial results and advantages are realized from the welding technique taught herein as applied to joinder of electrically conducitve materials, as will be understood from the details set forth below, and the process will be described herein only in connection with welding of such materials. As a result of the structural arrangement and method described above, the welding amperage requirements necessary to produce electric fusion welding of material according to the teachings in this case have been found to be on the order of one-half of the amperage involved in similar type welding wherein the workpiece is grounded. Thus, for example, two sheets of advanced alloy steel known as PH15–7MO corresponding to workpiece components 2 and 4, both having a thickness of .090 inch, were welded in the manner shown in FIGURE 1 using tungsten inert gas type electrodes moving along a substantially linear path relative to the workpiece components at a travel speed of 4½ inches per minute and a welding current of 20 amps with direct current. In contrast, welding by use of a single electrode such as electrode 8 and connecting conductor 16 to the workpiece components 2 and 4, thus eliminating electrode 10, was found to require almost twice the stated current or approximately 40 amps. Moreover, the weld nugget produced by the latter welding method had a typical cross-sectional shape such as shown in FIGURE 2 wherein reference numeral 18 denotes the weld nugget. From FIGURE 2, it may be seen that weld nugget 18 is non-symmetrical about axis 17 in that the upper surface of the weld seam is considerably wider than the lower surface thereof, whereby weld nugget 18 is substantially V-shaped as seen in cross-section.

In contrast to the showing of FIGURE 2, welding of workpiece components corresponding with items 2 and 4 as shown in FIGURE 1 in accordance with the structural arrangement and method suggested by the stated figure were found to produce a weld nugget having the typical cross-sectional shape shown in FIGURE 3, which shows weld nugget 6 as having a symmetrical shape about a vertical axis as indicated by reference numeral 20 and also about a horizontal axis 24. It may be seen from FIGURE 3 that the width of nugget 6 at its widest point as seen in cross-section and designated by reference 22 is substantially less than the thickness of the workpiece material which is designated by reference numeral 26. The stated reduction in width of the weld nugget in FIGURE 3 compared to that shown in FIGURE 2 has a direct relationship to the width of the heat-affected zone and to the amount of shrinkage resulting from the application of welding heat. Thus, a cross-sectional pattern in the weld nugget which is non-symmetrical about either a vertical or a horizontal axis in the manner shown by FIGURE 2 shows that a greater amount of heat is concentrated in one portion of the weld puddle than in another such portion during welding. The amount of heat required to be dissipated by the adjoining mass of base metal will of necessity differ correspondingly.

Moreover, the amount of heat required to fuse together two workpiece portions varies directly with the mass of molten metal produced in the weld puddle. Since the nugget mass in FIGURE 3 is less than that of FIGURE 2 for any given thickness of workpiece, the total heat involved in welding by each method differs in substantially the same proportion as the stated masses. In this connection, it has been found by repeated experiment that the amount of applied heat, and therefore the amount of resulting shrinkage and distortion upon cooling of the workpiece, varies directly with the amperage of the welding power. Therefore, the use of welding amperage to produce a weld as shown in FIGURES 1 and 3, which is approximately one-half of that required to produce the weld of FIGURE 2, produces commensurately less shrinkage and distortion. In addition, it may be seen that resistance heating of the workpiece due to flow of current therethrough is confined in the welding technique suggested by FIGURE 1 of the instant case to that portion situated directly between electrode 8 and 10, which represents a very small portion of the total workpiece mass. In contrast, welding by conventional techniques wherein a substantial portion of the total workpiece material is included in the welding power circuit characteristically results in aggravated heating effects due to electrically resistance offered by the workpiece material, with commensurately more severe distortion problems.

In further connection with the welding method suggested by FIGURES 1 and 3, it may be seen from FIGURE 4 that the reduced amperage requirements discussed above result from the fact that heat applied directly by the arc between electrodes 8 and 10 need not be so great as to penetrate completely through workpiece portions 2 or 4. Thus, FIGURE 4 shows areas 28 and 30 which represents the molten areas produced by electrodes 8 and 10 due to direct application of heat from the arc in each case. Areas 28 and 30 typically involve a penetration of about 20% of the thickness 26 of components 2 and 4 as indicated by the dimension designated by reference numeral 40. However, as shown in FIGURE 3, a weld puddle is produced in the workpiece having a cross-sectional pattern corresponding to nugget 6 which extends completely therethrough, whereby areas 28 and 30 are joined by a molten intermediate mass 32 which links together the two stated areas, and which is defined by dotted lines 34 and 36 in FIGURE 4. Intermediate molten mass 32 results in part from heat conductivity in the workpiece material between molten areas 28 and 30. However, intermediate mass 32 becomes molten primarily due to resistance heating in the case of electrically conductive workpiece materials, resulting from the fact that welding power is conducted directly through the workpiece between electrodes 8 and 10 as discussed above. The resistance heating effects thus described are naturally greater with A.C. than with D.C. welding power, whereby A.C. welding power is preferable.

In further connection with the heating phenomenon discussed above, very significant results and advantages have been found to accrue from the use of high frequency alternating current, approaching but less than radio frequency, superimposed upon the welding power signal.

The precise metallurgical phenomena accompanying this superimposed signal are not entirely known or understood; however, it appears reasonably certain that a more even distribution of welding heat and a helpful refinement of grain structure occur in the presence of the stated high frequency signal. In the presence of the stated superimposed signal, a slight but clearly perceptable change in the coloration of base metal adjacent to and proximate the molten puddle is produced in the workpiece during the welding operation, as suggested by area 38 shown in FIGURE 1. Considerably improved strength in the weld joint has been found to result from the use of the superimposed signal described above, apparently due in part to the fact that the high frequency signal, in combination with the resistance heating effect discussed above, results in a concentration of welding heat along a narrow and closely confined path whereby the mass of molten metal intermediate areas 28 and 30 is quite narrow and presents no critical heat-dissipation problems in most workpieces. In fact, it has been found that diffusion bonding of workpiece components related in substantially the same way shown for components 2 and 4 in FIGURE 1, for example, has resulted from application of high frequency current and relatively low amperage in the welding power. Thus, with welding amperage reduced to a level resulting in only slight penetration such as 5 to 10 percent of material thickness for dimension 40 in FIGURE 4, with slight increase in the amperage of the stated high frequency signal so that the welding current has substantially less amplitude than the high frequency current, components 2 and 4 have been found to join together at their adjacent abutting edges with little or no evidence of a weld nugget. Joints of the latter type have been found to be relatively much stronger than most fusion welded joints. In connection with the foregoing diffusion phenomena, it appears that the presence of a weld bead or nugget as shown at 28 and 30 in FIGURE 4 causes a force to be applied to workpiece components 2 and 4 during post-weld cooling which pulls the workpieces into closely abutting contact. The stated force enhances the heating effects produced by the same weld nugget on intermediate mass or area 32, whereby molecular diffusion of workpiece material from one component into the other component occurs along the plane of abutment indicated by reference numeral 42 in FIGURE 4. In the absence of a weld nugget 28 or 30, mere close mutual contact of the components in the relationship illustratively shown in FIGURE 4, for example, accompanied by exposure to high-frequency, low amperage current as discussed above, produces joints having strength properties approaching or equal to those of the base metal itself, even on workpieces of substantial thickness or mass wherein shrinkage and distortion are not of primary concern as in the case of thin gage metals. Moreover, diffusion bonding of components 2 and 4 arranged generally as shown in FIGURE 4 may be facilitated in the absence of any weld nugget 28 or 30 by insertion of a thin metallic strip 44 lying substantially along line 42 in FIGURE 4, whereby the confronting surfaces of components 2 and 4 would not abut each other directly as shown, for example, in FIGURES 1 or 4, but would contact the stated metallic strip on either side thereof. The foregoing arrangement of workpiece components is shown in FIGURE 5, wherein strip 44 is situated in contact with workpiece components 2 and 4 on either side thereof, and aligned substantially between electrodes 8 and 10. Pressure means for applying compressive force on the workpiece components either in connection with FIGURE 5 or any of the other figures in this case during current flow between electrodes 8 and 10 may take any convenient form known to the prior art, and are illustratively shown by FIGURE 5 as comprising a fixed surface 46 for restraining one end of the workpiece components and fluid motor means 48 operatively related to a platen 50 whereby fluid pressure within motor 48 may act on a piston contained therewithin to apply force to the workpiece through the movable platen. The material in such metallic strip may advantageously comprise one of the aggressive metals or alloys which are known to diffuse more readily or rapidly into the metals which may comprise workpiece components 2 and 4. In addition, diffusion of materials in workpiece components 2 and 4, either with or without an intermediate strip of the stated type, may be accelerated or enhanced by the application of force tending to push one of the said components against the other whereby the surfaces intended to diffuse into each other may be held in close and continuous contact during exposure to high-frequency current of the type discussed hereinabove, especially in the absence of a weld nugget such as shown at 28 and 30 in FIGURE 4.

From the details set forth above, it may be seen that the invention in this case is of particular usefulness in solving problems of shrinkage and distortion in workpiece elements, especially thin-walled elements having a particular sensitivity to the application of welding heat. Thus, the invention is useful in providing welds characterized by minimum cross-sectional area and symmetry of the weld nugget about a pair of normal axes. Improved welds of the foregoing type result from the application of welding heat by electrodes which pass the welding current through the workpiece without having the workpiece grounded. In addition, the stated welds are considerably enhanced with regard to ease of welding with minimum welding amperage and with further regard to final strength of the joint by the use of a high-frequency and relatively low amplitude current super-imposed on the welding current. In addition, the same problems of shrinkage and distortion are also solved by diffusion bonding between the workpiece components using the stated high-frequency current either with or without partial penetration of a weld puddle on either side of the workpiece surfaces being joined, or by the application of force holding the workpieces in close abutting contact or in close contact with an intermediate strip of aggressive metal or alloy during simultaneous exposure of the surfaces to the stated high-frequency, low amplitude current.

While the particular details set forth above and in the drawing are fully capable of attaining the objects and providing the advantages herein stated, the structure and method thus disclosed are merely illustrative and could be modified or varied to produce the same results without departing from the scope of the inventive concept as defined in the appended claims.

I claim:
1. An electrical circuit for joining together the material in a plurality of workpiece components, said circuit comprising:
   a source of alternating current,
   a pair of electrodes in substantial alignment on either side of said components with a portion of said components therebetween, and spaced apart from said electrodes, and
   electrical connection means between said source and said electrodes for passing said current in an electrical arc from one of said electrodes to the other of said electrodes through said workpiece material in said components.
2. The circuit set forth in claim 1 above, wherein:
   said components are mutually weldable, and
   said current is of sufficient amplitude to fusion weld said components.
3. The circuit set forth in claim 1 above, wherein:
   said components are of metallic material capable of bonding together by molecular diffusion, and
   said current is of relatively high frequency and relatively low amperage insufficient to cause said material to become molten.
4. Apparatus for forming a permanent joint between two confronting workpiece portions, said apparatus comprising:

a power source for supplying electrical power including relatively high-frequency current,
a pair of electrodes in substantial alignment on either side of and spaced apart from said portions,
electrical connection means between said source and said electrodes for passing said current in an electrical arc from one of said electrodes to the other of said electrodes through said portions, and
means for applying force tending to push said portions toward each other while simultaneously passing said current.

5. The apparatus set forth in claim 4 above, wherein: said power source supplies welding current in addition to said relatively high-frequency current, said welding current having substantially less amplitude than said high-frequency current.

6. An electrical welding circuit for fusion welding of a workpiece consisting of:
a source of welding power,
a pair of electrodes in substantial alignment on either side of said workpiece and spaced apart therefrom, and
electrical connection means between said source and said electrodes whereby welding current is passed in an electrical arc from one of said electrodes to the other of said electrodes directly through said workpiece.

7. The circuit set forth in claim 6 above, wherein: said source comprises an alternating current power source.

8. The circuit set forth in claim 6 above, wherein: said source further provides a high-frequency current combined with said welding current, said high-frequency current having relatively lower amplitude than said welding current.

9. An electrical welding circuit for fusion welding of a workpiece consisting of:
a source of electrical power for supplying a first signal having amperage sufficient to weld said workpiece and a second signal having high frequency and substantially less amperage than said first signal, said second signal being superimposed upon said first signal,
a pair of electrodes in substantial alignment on either side of said workpiece, and
electrical connection means between said source and said electrodes whereby said first and second signals are passed from one of said electrodes to the other of said electrodes directly through said workpiece.

10. A method for joining a pair of elongate edges on two workpiece components, each said edge having a surface area defined by the length and thickness of said edges, comprising:
placing said components with said surface areas in generally abutting relationship, positioning at least two electrodes on opposite sides of said edges with each of said electrodes in spaced relationship from said components,
exposing said components to a relatively high-frequency current passing from one to the other of said electrodes directly through said edges and entirely across said areas.

11. The method set forth in claim 10 above, including in addition thereto:
applying force to said two components in a direction toward each other to hold said components in firmly abutting contact simultaneously with said passage of high-frequency current and for a sufficient period of time to cause diffusion bonding of said components together.

12. The method of joining two metallic workpiece components comprising:
placing said components with the portions thereof to be joined in confronting relationship,
placing a metallic strip between said confronting portions and in contact therewith, said strip comprising metal of aggressive molecular diffusing characteristics with respect to said workpiece components, and
exposing said portions and said strip to a relatively high-frequency current passing through said portions for a sufficient period of time to cause said molecular diffusion between said portions and said strip.

13. The method set forth in claim 12 above, including in addition thereto:
applying force to said workpiece components tending to push said portions firmly against said strip.

14. In a method for joining a pair of workpiece components:
aligning a pair of electrodes in substantial alignment with one of said electrodes on one side of said workpiece components and the other of said electrodes on an opposite side of said workpiece components, both said electrodes being spaced apart from both said workpiece components, and
passing welding current directly from one said electrode to the other said electrode through atmosphere and through said workpiece components.

15. The method set forth in claim 14 above, including in addition thereto:
passing a low amperage and high-frequency current directly from one said electrode to the other said electrode through said workpiece in addition to said welding current and simultaneously therewith.

16. The method set forth in claim 14 above, including in addition thereto:
applying force to said workpiece on opposite sides of the workpiece location through which said welding current passes.

17. The method set forth in claim 16 above, including in addition thereto:
passing a relatively high-frequency current having less amplitude than said welding current through said workpiece simultaneously with said welding current.

References Cited by the Examiner

UNITED STATES PATENTS

| | | | |
|---|---|---|---|
| 395,878 | 1/1889 | Coffin | 219—137 |
| 1,189,584 | 7/1916 | Klicklighter | 219—78 |
| 1,604,181 | 10/1926 | Lincoln | 219—137 |
| 2,036,233 | 4/1936 | Pakala | 219—137 X |
| 2,363,332 | 11/1944 | Jennings et al. | 219—137 X |
| 2,919,342 | 12/1959 | Kohler et al. | 219—67 X |
| 2,919,343 | 12/1959 | Rudd | 219—67 X |
| 2,922,026 | 1/1960 | Hauptmann | 219—116 |
| 3,004,136 | 10/1961 | Peterson | 219—67 |
| 3,050,617 | 8/1962 | Lasch et al. | 219—85 |
| 3,073,945 | 1/1963 | Osterer et al. | 219—67 |
| 3,179,785 | 4/1965 | Belardi et al. | 219—85 |
| 3,213,816 | 12/1965 | Marsden | 219—61 |

FOREIGN PATENTS

| | | |
|---|---|---|
| 1,002,098 | 2/1957 | Germany. |
| 1,126,538 | 3/1962 | Germany. |

RICHARD M. WOOD, *Primary Examiner.*

ANTHONY BARTIS, *Examiner.*

B. A. STEIN, *Assistant Examiner.*